US009193887B2

(12) United States Patent
Hine et al.

(10) Patent No.: US 9,193,887 B2
(45) Date of Patent: Nov. 24, 2015

(54) SURFACE COMPOSITION AND METHOD OF APPLICATION THEREOF

(71) Applicant: Vero Industries IP PTY LTD, Kenmore (AU)

(72) Inventors: Rohan James Hine, Kenmore (AU); Michael Peter Spinaze, Indooroopilly (AU)

(73) Assignee: Vero Industries IP Pty Ltd, Kenmore (AU)

( * ) Notice: Subject to any disclaimer, the term of this patent is extended or adjusted under 35 U.S.C. 154(b) by 0 days.

(21) Appl. No.: 14/396,275

(22) PCT Filed: May 9, 2013

(86) PCT No.: PCT/AU2013/000473
§ 371 (c)(1),
(2) Date: Oct. 22, 2014

(87) PCT Pub. No.: WO2013/166551
PCT Pub. Date: Nov. 14, 2013

(65) Prior Publication Data
US 2015/0125615 A1 May 7, 2015

(30) Foreign Application Priority Data

May 10, 2012 (AU) .................... 2012901896

(51) Int. Cl.

| | | |
|---|---|---|
| *C09D 167/02* | (2006.01) | |
| *C09D 163/00* | (2006.01) | |
| *C04B 26/14* | (2006.01) | |
| *C04B 26/18* | (2006.01) | |
| *C04B 14/06* | (2006.01) | |
| *C09D 7/12* | (2006.01) | |
| *C04B 111/00* | (2006.01) | |
| *C04B 111/60* | (2006.01) | |
| *C08K 3/36* | (2006.01) | |

(52) U.S. Cl.
CPC .............. *C09D 167/02* (2013.01); *C04B 14/06* (2013.01); *C04B 26/14* (2013.01); *C04B 26/18* (2013.01); *C09D 7/1216* (2013.01); *C09D 7/1283* (2013.01); *C09D 163/00* (2013.01); *C04B 2111/00482* (2013.01); *C04B 2111/60* (2013.01); *C08K 3/36* (2013.01)

(58) Field of Classification Search
CPC .. C09D 163/00; C09D 167/02; C09D 7/1283; C09D 7/1216; C04B 26/14; C04B 26/18; C04B 14/06; C04B 20/0076; C04B 14/303; C04B 40/0028; C04B 40/0089; C04B 2111/00482; C08K 3/36
See application file for complete search history.

(56) References Cited

U.S. PATENT DOCUMENTS

| | | | | |
|---|---|---|---|---|
| 3,954,944 | A * | 5/1976 | Aldcroft | ............... C01B 33/193 |
| | | | | 423/335 |
| 5,132,356 | A * | 7/1992 | Siddiqui | .................... C08J 5/18 |
| | | | | 523/219 |
| 8,257,145 | B2 | 9/2012 | Young | |
| 2003/0069347 | A1* | 4/2003 | Oishi | ...................... C01B 33/18 |
| | | | | 524/492 |
| 2005/0074619 | A1* | 4/2005 | Peiffer | ................... B32B 27/36 |
| | | | | 428/480 |
| 2007/0232727 | A1* | 10/2007 | Lin | ........................ B82Y 30/00 |
| | | | | 523/440 |

FOREIGN PATENT DOCUMENTS

| | | |
|---|---|---|
| CN | 102140300 | 8/2011 |
| DE | 3239983 | 5/1984 |
| DE | 4137566 | 5/1993 |
| EP | 1 878 712 | 1/2008 |
| JP | 59-210980 | 11/1984 |
| JP | 7-331171 | 12/1995 |
| JP | 2002-367432 | 12/2002 |
| KR | 994833 | 11/2010 |

\* cited by examiner

*Primary Examiner* — Alexander Kollias
(74) *Attorney, Agent, or Firm* — Scherrer Patent & Trademark Law, P.C.; Stephen T. Scherrer; Monique A. Morneault

(57) ABSTRACT

A composition for forming a protective layer on a substrate comprises a plurality of silicas having different particle size ranges, and a curable resin. The substrate may be a building substrate such as a floor or wall concrete, blocks or bricks. The silica is typically white or colorless crystalline compound, $SiO_2$, occurring abundantly as quartz, sand, flint, agate, and many other minerals used to manufacture a wide variety of materials, especially glass and concrete.

16 Claims, No Drawings

SURFACE COMPOSITION AND METHOD OF APPLICATION THEREOF

TECHNICAL FIELD

The present invention is directed to a curable composition that can be applied as a surface material on a building and cured to form a hard protective layer for the structure of a building. The present invention is also directed to a method of application. A preferred use of the composition is to provide a hard tough trafficable floor layer.

BACKGROUND

Any references to methods, apparatus or documents of the prior art are not to be taken as constituting any evidence or admission that they formed, or form part of the common general knowledge.

Compositions, and particularly fluid compositions that can be applied over a surface and then hardened (for instance by curing) are known. These compositions are particularly useful to protect a floor.

Flooring materials must withstand the wear and tear of human inhabitants and protect the building structure from damage caused by water, humidity and habitation.

As flooring surface materials may be used over large exposed areas it is important that they contain no environmentally dangerous substances which may either contaminate local environments when in external use, or emit unhealthy gases or dangerous dust particles into internal living spaces. They should also be chemically and physically inert and stable during the entire lifespan of the building.

To meet the contemporary demands of architects and home owners it is preferable that a floor surfacing system be aesthetically beautiful, hardwearing, non-porous, seamless, maintenance free, and capable of enduring changes in both use and climatic conditions for the life of the building without deteriorating. Flooring products should also be capable of formulation with a variety of appearances, allowing design flexibility to meet individual décor requirements of building designers and to achieve a long aesthetic life.

Optimally flooring surfaces should be scratch, slip, stain, abrasion and impact resistant, physically stable and chemically inert.

Historically, cement, concrete, slate, stone, ceramic tiles, plastic products, solid wood and plant based building boards have all been used for this purpose as specific flooring products, Flooring can broadly categorised as modular and non-modular.

Non modular methods used to achieve these criteria in the past include compacted earth, lime, terrazzo, polished concrete, resin based topcoats and 2 part epoxy coatings. All of these surfaces have the advantage of not requiring an adhesive layer to bond to the floor but their major negative attribute is that they all are subject to deterioration without appropriate maintenance and sealing applications.

The consequences of poor maintenance may be a reduced surface gloss with epoxies, or liberation of silica dust from polished concrete or complete failure of compacted earth. Application of these products may also dictate that over time cracks may appear within the surfaces which are not complimentary to the finished product.

Modular methods include ceramic, segmented concrete and natural stone surfaces. These require joints to facilitate expansion and contraction. This requires a skilled approach to laying and necessitates grouting joints between sections and the application of specialised adhesive products or mortars to ensure long life. The functionality of ceramic tiles and natural stone varies greatly with variability of porosity and surface finish dictating the final stain and slip resistance.

It is known to provide resin based topcoats where polymeric resin is mixed with marble and other aggregates to provide a decorative flooring surface which is polished flat, then sealed. These products have limited durability due to the softer aggregates used, limited functionality due to the sealing process ongoing maintenance requirements and easily develop integral cracks in areas of nonstandard dimensions.

It is also known to use polished concrete to achieve a seamless surface allowing for the design of large surface areas without the need for segmented joints. The natural shrinkage of concrete as it cures means that with time concrete develops a network of surface cracks which detract from the unified surface which is initially attractive. Polished concrete is also dependent upon surface sealant products and maintenance procedures which are critical to the ongoing functionality of the surface.

Other disadvantages with existing surface coating compositions is the lack of
  porosity/stain resistance,
  hardness/scratch resistance,
  seamless application,
  aesthetic appeal/design diversity,
  slip resistance/level of polish,
  customisability/individual application,
  mechanical/flexural qualities,
and the high maintenance of such surfaces.

Further disadvantages with many existing techniques is that sealing is often needed due to the porous nature of the existing composite material. Standard segmented flooring products such as ceramic tile and natural stone require specialised bonding adhesive and grouts to fill necessary gaps between segments after installation.

Further disadvantages with many existing techniques is that it is not possible to cast in-situ into existing buildings over existing substrates, it is not possible to surface areas seamlessly over different levels and over concrete joints, and it is not possible to cast large areas without batch variations inherent in many manufactured flooring products.

It is an object of the present invention to provide a composition and/or method and/or apparatus which may overcome at least some of the abovementioned disadvantages or provide a useful or commercial choice,

SUMMARY OF THE INVENTION

According to a first aspect of the present invention there is provided a composition for forming a protective layer on a substrate, the composition comprising a plurality of silicas having different particle size ranges, and a curable resin.

The substrate is preferably a building substrate such as a floor or wall. The substrate may comprise concrete, blocks or bricks.

The silica is typically white or colorless crystalline compound, $SiO_2$, occurring abundantly as quartz, sand, flint, agate, and many other minerals and used to manufacture a wide variety of materials, especially glass and concrete.

Suitably, the silicas have a particle size range of between 50 um-5 mm.

Suitably, between 50-70% of the silicas have a particle range of between 50 um-1 mm, and between 30-50% of the silicas have a particle range of between 1-5 mm.

Suitably, the composition comprises between 3-10 silicas of different particle size ranges. Preferably, the composition comprises 5-6 or about 5-6 silicas of different particle size ranges.

Suitably, the composition comprises at least some of the following silicas:

A. Silica having a particle size range between 0.5 mm-0.1 mm, and preferably between about 0.3 mm-0.15 mm. The amount of silica may be between 10-40%, and preferably between 16-27%

B. Silica having a particle size range between 1.5 mm-0.1 mm, and preferably between about 1 mm-0.25 mm. The amount of silica may be between 10-40%, and preferably between 16-27%

C. Silica having a particle size range between 1.0-1.5 mm, and suitably between 0.85-1.2 mm. The amount of silica may be between 4-25%, and preferably between about 8-17%.

D. Silica having a particle size range between 1.5 mm-2.5 mm, and suitably between 1.8-2.2 mm. The amount of silica may be between 4-25%, and preferably between about 8-17%.

E. Silica having a particle size range between 2-4 mm, and suitably between 2.8-3.2 mm. The amount of silica may be between 5-20%, and suitably between 11-13%.

F. Silica having a particle size range between 0.6-8 mm, and suitably between 1-5 mm. The amount of silica may be between 2-15%, and suitably between 4-9%.

Suitably, the composition comprises silicas A-F or A-E.

Suitably, the composition comprises:
A—10%-30% of a silica having a particle range between 0.2-0.05 mm, and
B—10%-30% of a silica having a particle range between 2.0-0.1 mm, and
C—5%-25% of a silica having a particle range between 0.60-2 mm, and
D—5%-25% of a silica having a particle range between 2.0-3.0 mm, and
E—5%-20% of a silica having a particle range between 3.0-4.0 mm, and
F—2%-15% of a silica having a particle range between 1.0-5.0 mm, and
between 5%-20% of the resin.

Suitably, the composition comprises:
A—10%-30% of a silica having a particle range between 0.3-0.15 mm, and
B—10%-30% of a silica having a particle range between 1.0-0.25 mm, and
C—5%-25% of a silica having a particle range between 0.85-1.2 mm, and
D—5%-25% of a silica having a particle range between 1.8-2.2 mm, and
E—5%-20% of a silica having a particle range between 2.8-3.2 mm, and
F—2%-15% of a silica having a particle range between 1.0-5.0 mm, and
between 5%-20% of the resin.

Suitably, the percentages of silicas A-F are:
A—16%-27%
B—18%-27%
C—8%-17%
D—8%-13%
E—11%-13%
F—4%-9%

Suitably, the composition comprises silicas in the following proportions

| Silica 150 um-300 um | 26.23% |
| Silica 250 um-1 mm | 26.23% |
| Silica + 1 mm | 13.77% |
| Silica + 2 mm | 7.87% |
| Silica + 3 mm | 7.87% |

The curable resin may comprise a casting resin. The resin may comprise a polyester resin, an orthophthalic resin, an acrylic modified polyester resin and the like. Preferably, the resin is a polyester resin based on Isophthalic Acid and Neopentyl Glycol. If the resin is a polyester resin, the amount of resin in the composition may be between 5-25%, and suitably between 10-18%, and preferably at or about 13.96%.

The resin may comprise an epoxy resin. The epoxy resin may be sourced from bio-renewable materials or from plant processes as opposed to being sourced from fossil fuels. A suitable epoxy resin may comprise an epoxidized pine oil, and/or a phenolic epoxy resin such as a bisphenol epoxy resin. If the resin is an epoxy resin, the amount of resin in the composition may be between 5-25%, and suitably between 10-18%, and preferably at or about 13.96%.

The composition may include a curing or initiator agent. The agent may comprise a peroxide. A suitable peroxide may comprise MEKP [Methyl Ethyl Ketone Peroxide] initiator. The amount of agent may be between 0.1-1%, suitably between 0.1-0.5% and preferably at or about 0.21%. The agent may comprise a hardening agent which may comprise an amine. The amine may comprise a polyoxypropylenediamine used as an epoxy curing agent which can result in tough, clear, impact-resistant coatings and castings, an amidoamine, an aliphatic amine, and/or cycloaliphatic amine.

The composition may include at least one additive to provide desirable properties to the composition. A suitable additive is to improve the stain resistance of the finished product. A suitable stain resistant enhancing additive comprises Alumina Tri-hydrate. The Alumina may be present in an amount between 0.5-10%, and suitably between 0.5-6% and preferably at or about 3.87%. The Alumina Tri-hydrate may be present for reasons other than as a stain resisting additive. Aluminium hydroxide and alumina hydrate may be used interchangeably.

The composition may include a coupling agent. The coupling agent is preferably an agent suitable for use in polymer concrete and solid surface applications. A suitable agent comprises a C 8000 coupling agent. The agent may improve mechanical properties such as flexural strength, compressive strength, and E-modulus. The amount of coupling agent used may vary depending on the particular agent, but if the agent is C 8000, the amount is suitably between 0.003-0.015%, more suitably between 0.005-0.011%, and preferably at or about 0.008%.

In a particularly preferred form, the composition may comprise
A 24-28% of a silica having a particle range between 0.3-0.15 mm, and
B—24-28% of a silica having a particle range between 1.0-0.25 mm, and
C—7-9% of a silica having a particle range between 0.85-1.2 mm, and
D—7-9% of a silica having a particle range between 1.8-2.2 mm, and
E—11-13% of a silica having a particle range between 2.8-3.2 mm, and F—3-5% of a silica having a particle range between 1.0-5.0 mm, and
13-17% of a polyester resin, and
0.15-0.4% of MEKP.

In a particularly preferred form, the composition may comprise
A—14-18% of a silica having a particle range between 0.3-0.15 mm, and
B—14-18% of a silica having a particle range between 1.0-0.25 mm, and
C—14-18% of a silica having a particle range between 0.85-1.2 mm, and
D—10-14% of a silica having a particle range between 1.8-2.2 mm, and
E—10-14% of a silica having a particle range between 2.8-3.2 mm, and
F—6-10% of a silica having a particle range between 1.0-5.0 mm, and
14-18% of a polyester resin, and
0.1-0.2% of MEKP, and
heat treating the above mixture at between 60-80 degrees centigrade for between 60-120 minutes to form the cured composition.

In a particularly preferred form, the composition may comprise
A—24-28% of a silica having a particle range between 0.3-0.15 mm, and
B—24-28% of a silica having a particle range between 1.0-0.25 mm, and
C—7-9% of a silica having a particle range between 0.85-1.2 mm, and
D—7-9% of a silica having a particle range between 1.8-2.2 mm, and
E—11-13% of a silica having a particle range between 2.8-3.2 mm, and
F—3-5% of a silica having a particle range between 1.0-5.0 mm, and
13-17% of a polyester resin, and
0.15-0.4% of MEKP, and
0.2-0.4% of a decorative additive in the form of a liquid colour.

In a particularly preferred form, the composition may comprise
A—14-19% of a silica having a particle range between 0.3-0.15 mm, and
B—14-19% of a silica having a particle range between 1.0-0.25 mm, and
C—14-19% of a silica having a particle range between 0.85-1.2 mm, and
D—10-15% of a silica having a particle range between 1.8-2.2 mm, and
E—10-15% of a silica having a particle range between 2.8-3.2 mm, and
F—6-11% of a silica having a particle range between 1.0-5.0 mm, and
13-17% of a polyester resin, and
0.15-0.4% of MEKP, and
heat treating the above mixture at between 60-80 degrees centigrade for between 60-120 minutes to form the cured composition.

In a particularly preferred form, the composition may comprise
A—24-28% of a silica having a particle range between 0.3-0.15 mm, and
B—24-28% of a silica having a particle range between 1.0-0.25 mm, and
C—7-9% of a silica having a particle range between 0.85-1.2 mm, and
D—7-9% of a silica having a particle range between 1.8-2.2 mm, and
E—11-13% of a silica having a particle range between 2.8-3.2 mm, and
F—3-5% of a silica having a particle range between 1.0-5.0 mm, and
13-17% of a polyester resin, and
0.15-0.4% of MEKP, and
heat treating the above mixture at between 60-80 degrees centigrade for between 60-120 minutes to form the cured composition.

In a particularly preferred form, the composition may comprise
A—24-28% of a silica having a particle range between 0.3-0.15 mm, and
B—24-28% of a silica having a particle range between 1.0-0.25 mm, and
C—7-9% of a silica having a particle range between 0.85-1.2 mm, and
D—7-9% of a silica having a particle range between 1.8-2.2 mm, and
E—11-13% of a silica having a particle range between 2.8-3.2 mm, and
F—3-5% of a silica having a particle range between 1.0-5.0 mm, and
10-25% of an epoxy resin and hardener, and
heat treating the above mixture at between 60-80 degrees centigrade for between 60-120 minutes to form the cured composition.

In a particularly preferred form, the composition may comprise
A—24-28% of a silica having a particle range between 0.3-0.15 mm, and
B—24-28% of a silica having a particle range between 1.0-0.25 mm, and
C—7-9% of a silica having a particle range between 0.85-1.2 mm, and
D—7-9% of a silica having a particle range between 1.8-2.2 mm, and
E—11-13% of a silica having a particle range between 2.8-3.2 mm, and
F—3-5% of a silica having a particle range between 1.0-5.0 mm, and
0.5-1-5% of a filler in the form of alumina tri hydrate, and
13-17% of a polyester resin, and
0.15-0.4% of MEKP.

In a particularly preferred form, the composition may comprise
A—24-28% of a silica having a particle range between 0.3-0.15 mm, and
B—24-28% of a silica having a particle range between 1.0-0.25 mm, and
C—7-9% of a silica having a particle range between 0.85-1.2 mm, and
D—7-9% of a silica having a particle range between 1.8-2.2 mm, and
E—11-13% of a silica having a particle range between 2.8-3.2 mm, and
F—3-5% of a silica having a particle range between 1.0-5.0 mm, and
1-6-2.5% of a filler in the form of alumina tri hydrate, and
13-17% of a polyester resin, and
0.15-0.4% of MEKP.

The composition suitably has a compressive strength of between 50 MPA-100 MPA.

The composition suitably has a Barcol Hardness of between 30-60 and preferably between 39-46.

The composition suitably comprises a protective flooring layer.

In a particularly preferred form, the composition may comprise:

| | |
|---|---|
| Silica 150 um-300 um | 26.23% |
| Silica 250 um-1 mm | 26.23% |
| Silica + 1 mm | 13.77% |
| Silica + 2 mm | 7.87% |
| Silica + 3 mm | 7.87% |
| Alumina Tri-hydrate | 3.87% |
| Polyester Resin (ISO NPG) | 13.96% |
| MEKP Initiator | 0.21% |
| C 8000 coupling agent | 0.008% |

In another form the invention comprises a method for forming a composition comprising a plurality of silicas having different particle size ranges and a curable resin, the method comprising mixing the silicas with alumina hydrate in a first container; mixing the resin with a coupling agent and an initiator in a second container; combining and mixing the mixtures in a container; and applying reduced pressure to the container to remove air from the mixture.

The silicas, aluminia tri hydrate, resin, coupling agent and initiator may be as described above.

The reduced air pressure may comprise about 1 bar pressure for 5 minutes while mixing.

The composition can be left to harden. This can be done at ambient temperature and with exposure to air. The hardening time may be between 1-10 hours and typically between 1-3 hours.

The composition can be subjected to a post curing step. This step may use heat. The composition may be heated to 80° C. for a period of at least 2 hours to completely harden and chemically stabilise the composite materials.

DETAILED DESCRIPTION OF PREFERRED EMBODIMENTS

Example 1

The composition according to a preferred embodiment of the invention is as follows:

| | |
|---|---|
| Silica 150 um-300 um | 26.23% |
| Silica 250 um-1 mm | 26.23% |
| Silica + 1 mm | 13.77% |
| Silica + 2 mm | 7.87% |
| Silica + 3 mm | 7.87% |
| Alumina Tri-hydrate | 3.87% |
| Polyester Resin (ISO NPG) | 13.96% |
| MEKP Initiator | 0.21% |
| C 8000 coupling agent | 0.008% |

All the silica must be thoroughly clean, dry and free from organic inclusions or contaminants.

The silica and the alumina hydrate are mixed thoroughly within a mechanical mixer (not illustrated) sufficient to ensure they are homogenously combined.

The polyester resin is measured into a mixing container in the exact proportions to the recipe.

The coupling agent is added to the resin and mixed thoroughly.

The initiator is added to the resin and mixed thoroughly.

The resin, silica and alumina tri-hydrate are combined within a mechanical mixer and mixed thoroughly whilst applying vacuum pressure to remove all air from the mixed materials. (1 bar pressure for 5 minutes while mixing.)

The material can then be applied to a surface and allowed to harden. A post curing step using heat can be used.

Table 1 illustrates 9 compositions—Examples 2-10—using different silica size ranges and amounts and with different resins and additives. These are formulated using the general method described above—it being appreciated that some additives may not be present in all examples.

Compression testing was done using an Avery Universal Testing Machine

TABLE 1

| SAMPLE NO | P2EC2A(1) EXAMPLE 2 | P2ECLARGE(2) EXAMPLE 3 | P2EC2A(2) EXAMPLE 4 | P2ECLARGE(1) EXAMPLE 5 | P2EC2A(3) EXAMPLE 6 |
|---|---|---|---|---|---|
| Compressive Strength (MPA) | 59.30 | 72.37 | 77.15 | 78.03 | 78.32 |
| (Std Deviation of test samples) | 3.39 | 7.71 | 0.97 | 1.72 | 1.02 |
| Barcol Hardness | 41.00 | 39.00 | 45.00 | 46.00 | 41.00 |
| (Std Deviation of resin samples) | 3.50 | 2.50 | 1.30 | 2.70 | 2.10 |
| Post Cured @ 73 deg for 90 minutes | | yes | | yes | yes |
| Strength increase after heat treatment | | | | | 30% |
| QUARTZ Predominately Silica ($SiO_2$) | | | | | |
| A (.30-.15 mm) | 25.973% | 16.632% | 25.967% | 16.667% | 25.970% |
| B (1-.25 mm) | 25.973% | 16.632% | 25.967% | 16.667% | 25.970% |
| C (.85-1.2 mm) | 8.095% | 16.632% | 8.093% | 16.667% | 8.095% |
| D (1.8-2.2 mm) | 8.095% | 12.474% | 8.093% | 12.500% | 8.095% |
| E (2.8-3.2 mm) | 12.143% | 12.474% | 12.140% | 12.500% | 12.142% |
| F (1-5 mm) | 4.048% | YB2 (4.5-1 mm) 8.316% * | 4.047% | 8.333% | 4.047% |

TABLE 1-continued

| FILLER | | | | | |
|---|---|---|---|---|---|
| Al2O3 B153 (10 um) | | | | | |
| RESINS | | | | | |
| Isopthalic NPG polyester resin (POLYPLEX SS15) | 15.179% | 16.379% | 15.175% | 16.413% | 15.177% |
| Entropy Epoxy Resin (70%) | | | | | |
| Entropy Epoxy Hardener (30%) | | | | | |
| INITIATOR | | | | | |
| MEKP NR 20 | 0.228% | 0.131% | 0.228% | 0.131% | 0.228% |
| DECORATIVE ADDITIVES | | | | | |
| Liquid Colours | 0.097% | 0.313% | 0.290% | 0.105% | 0.107% |

| SAMPLE NO | P2EC2A(7) EXAMPLE 7 | P2EC2A(4) EXAMPLE 8 | EC2 EXAMPLE 9 | EC2A EXAMPLE 10 |
|---|---|---|---|---|
| Compressive Strength (MPA) | 79.57 | 84.71 | 87.45 | 92.60 |
| (Std Deviation of test samples) | 2.19 | 4.30 | 2.31 | 2.17 |
| Barcol Hardness | 10.00 | 45.00 | 46.00 | 45.00 |
| (Std Deviation of resin samples) | 1.10 | 1.70 | 0.80 | 0.70 |
| Post Cured @ 73 deg for 90 minutes | yes | yes | | |
| Strength increase after heat treatment | | 10% | | |
| QUARTZ Predominately Silica (SiO2) | | | | |
| A (.30-.15 mm) | 25.217% | 26.014% | 25.46% | 25.82% |
| B (1-.25 mm) | 25.217% | 26.014% | 25.46% | 25.82% |
| C (.85-1.2 mm) | 7.860% | 8.108% | 8.49% | 8.05% |
| D (1.8-2.2 mm) | 7.860% | 8.108% | 8.49% | 8.05% |
| E (2.8-3.2 mm) | 11.790% | 12.163% | 12.74% | 12.07% |
| F (1-6 mm) | 3.930% | 4.054% | 4.24% | 4.02% |
| FILLER | | | | |
| Al2O3 B153 (10 um) | | | 0.95% | 2.02% |
| RESINS | | | | |
| Isopthalic NPG polyester resin (POLYPLEX SS15) | N/A | 15.204% | 13.97% | 13.95% |
| Entropy Epoxy Resin (70%) | 12.607% | | | |
| Entropy Epoxy Hardener (30%) | 5.404% | | | |
| INITIATOR | | | | |
| MEKP NR 20 | N/A | 0.228% | 0.21% | 0.21% |
| DECORATIVE ADDITIVES | | | | |
| Liquid Colours | 0.115% | 0.107% | N/A | N/A |

* contained large amounts of impurities and some soft rock

Table 1 illustrates that flooring compositions can be formulated with a compressive strength from 60-92 MPA. The table also illustrates the advantage of using alumina trihydrate and the lower resin content.

There is a particular advantage in having a minimum of 25% of the silicas above 1 mm in size. While not wishing to be bound by theory, it seems that these 25% of larger particles contribute to a much lower demand for resin to coat outer surfaces than do finer quartz particles.

The table results also confirms up to 16% resin can be used to still get reasonably high compressive strength provided we have considerable particles>1 mm.

The other interesting observation is the increase from EC2 to EC2A of 5 mpa with the doubling of the AL2O3. This possibly indicates the alumina tri hydrate may perform some strengthening function—which may be due to it displacing area within the matrix that would otherwise be taken up by resin (as it is a mineral filler).

The relationship between quartz particle size grading and minimum quantity of resin required to coat all particles is important to achieving high strengths. Table 2 illustrates additional examples and comparative examples.

TABLE 2

| SAMPLE NO | T1 | T2 | T3 | T4 | T5 |
|---|---|---|---|---|---|
| Compressive Strength (MPA) | | 72.19 | 75.62 | 37.86 | 65.74 |
| (Std Deviation) | | 13.43 | 2.97 | 5.71 | 5.89 |
| Barcol Hardness | 45.00 | 39.00 | 50.00 | 49.00 | 50.00 |
| (Std Deviation) | 1.20 | 0.80 | 0.50 | 1.10 | 0.70 |
| Post Cured @ 73 deg for 90 minutes Strength increase after heat treatment | | | | | |
| QUARTZ Predominately Silica (SiO2) | | | | | |
| YB1 (1-.25 mm) | 29.97% | 28.26% | 38.19% | 84.83% | 11.49% |
| YB2 (4.5-1 mm) | 29.97% | 28.26% | 8.49% | | 11.49% |
| RIS1 (.30-.16 mm) | 29.97% | 28.26% | 38.19% | | 61.88% |
| EC (1-.25 mm) | | | | | |
| EC (.85-1.2 mm) | | | | | |
| EC (1.8-2.2 mm) | | | | | |
| EC (2.8-3.2 mm) | | | | | |
| EC O/S (1-5 mm) | | | | | |
| FILLERS | | | | | |
| A1203 B153 (10 um) | 1.00% | 1.00% | 0.95% | 1.00% | 0.95% |
| RESINS | | | | | |
| Isopthallc NPG polyester resin (POLYPLEX SS15) | 8.99% | 13.95% | 13.97% | 13.96% | 13.97% |
| GY 191 CI (62.5%) | | | | | |
| Aradur 2961 LC 2000 (37.5%) | | | | | |
| Entropy Epoxy Resin (70%) | | | | | |
| Entropy Epoxy Hardener (30%) | | | | | |
| INITIATOR | | | | | |
| MEKP NR 20 | 0.09% | 0.28% | 0.21% | 0.21% | 0.21% |
| PERFORMANCE ADDITIVE | | | | | |
| BYK C8000 Polymeric coupling agent | | | | | |
| DECORATIVE ADDITIVES | | | | | |
| Liquid Colours | | | | | |
| .6-1 mm Garnet | | | | | |

| SAMPLE NO | EC1 | EC2 | EC3 | EC4 | EC5 | EC2A | EC3A |
|---|---|---|---|---|---|---|---|
| Compressive Strength (MPA) | 75.31 | 87.45 | 85.45 | 52.45 | 74.61 | 92.60 | 85.82 |
| (Std Deviation) | 0.80 | 2.31 | 7.88 | 7.75 | 14.64 | 2.17 | 4.60 |
| Barcol Hardness | 50.00 | 46.00 | 50.00 | 47.00 | 49.00 | 45.00 | 43.00 |
| (Std Deviation) | 0.30 | 0.80 | 0.50 | 0.70 | 0.80 | 0.70 | 1.70 |
| Post Cured @ 73 deg for 90 minutes Strength Increase after heat treatment | | | | | | | |
| QUARTZ Predominately Silica (SiO2) | | | | | | | |
| YB1 (1 - .26 mm) | | | | | | | |
| YB2 (4.5 -1 mm) | | | | | | | |
| RIS1 (.30-.15 mm) | 42.43% | 25.46% | 25.46% | 33.95% | 57.29% | 25.82% | 26.23% |
| EC (1 -.25 mm) | 10.61% | 25.46% | 25.48% | 33.95% | | 25.82% | 26.23% |
| EC (.85-1.2 mm) | 10.61% | 8.49% | 16.97% | 8.49% | 10.61% | 8.05% | 13.77% |
| EC (1.8-2.2 mm) | 10.61% | 8.49% | 8.49% | 8.49% | | 8.05% | 7.87% |
| EC (2.8-3.2 mm) | 10.61% | 12.74% | 8.49% | | | 12.07% | 7.87% |
| EC O/S (1-5 mm) | | 4.24% | | | | 4.02% | |
| FILLERS | | | | | | | |
| A1203 B153 (10 um) | 0.95% | 0.95% | 0.95% | 0.95% | 0.95% | 2.02% | 3.87% |

TABLE 2-continued

| RESINS | | | | | | | |
|---|---|---|---|---|---|---|---|
| Isopthalic NPG polyester resin (POLYPLEX SS15) | 13.97% | 13.97% | 13.97% | 13.97% | 13.97% | 13.95% | 13.96% |
| GY 191 CI (62.5%) Aradur 2961 LC 2000 (37.5%) | | | | | | | |
| Entropy Epoxy Resin (70%) Entropy Epoxy Hardener (30%) | | | | | | | |
| INITIATOR | | | | | | | |
| MEKP NR 20 | 0.21% | 0.21% | 0.21% | 0.21% | 0.21% | 0.21% | 0.21% |
| PERFORMANCE ADDITIVE | | | | | | | |
| BYK C8000 Polymeric coupling agent | | | | | | | |
| DECORATIVE ADDITIVES | | | | | | | |
| Liquid Colours | | | | | | | |
| .6-1 mm Garnet | | | | | | 6.36% | |

| SAMPLE NO | P2EC2A(1) | P2EC2A(2) | P2EC2A(3) | P2EC2A(4) |
|---|---|---|---|---|
| Compressive Strength (MPA) | 59.30 | 77.15 | 78.32 | 84.71 |
| (Std Deviation) | 3.39 | 0.97 | 1.02 | 4.30 |
| Barcol Hardness | 41.00 | 45.00 | 41.00 | 45.00 |
| (Std Deviation) | 3.50 | 1.30 | 2.10 | 1.70 |
| Post Cured @ 73 deg for 90 minutes | | | yes | yes |
| Strength increase after heat treatment | | | 30% | 10% |
| QUARTZ Predominately Silica (SiO2) | | | | |
| YB1 (1-.25 mm) | | | | |
| YB2 (4.5-1 mm) | | | | |
| RIS1 (.30-.15 mm) | 25.973% | 25.967% | 25.970% | 26.014% |
| EC (1-.25 mm) | 25.973% | 25.967% | 25.970% | 26.014% |
| EC (.85-1.2 mm) | 8.095% | 8.093% | 8.095% | 8.108% |
| EC (1.8-2.2 mm) | 8.095% | 8.093% | 8.095% | 8.108% |
| EC (2.8-3.2 mm) | 12.143% | 12.140% | 12.142% | 12.163% |
| EC O/S (1-5 mm) | 4.048% | 4.047% | 4.047% | 4.054% |
| FILLERS | | | | |
| A1203 B153 (10 um) | | | | |
| RESINS | | | | |
| Isopthalic NPG polyester resin (POLYPLEX SS15) | 15.179% | 15.175% | 15.177% | 15.204% |
| GY 191 CI (62.5%) Aradur 2961 LC 2000 (37.5%) | | | | |
| Entropy Epoxy Resin (70%) Entropy Epoxy Hardener (30%) | | | | |
| INITIATOR | | | | |
| MEKP NR 20. | 0.228% | 0.228% | 0.228% | 0.228% |
| PERFORMANCE ADDITIVE | | | | |
| BYK C8000 Polymeric coupling agent | 0.169% | | 0.189% | |

TABLE 2-continued

| | | | | |
|---|---|---|---|---|
| DECORATIVE ADDITIVES | | | | |
| Liquid Colours .6-1 mm Garnet | 0.097% | 0.290% | 0.107% | 0.107% |
| SAMPLE NO | P2EC2A(7) | P2EC5A(1) | P2EC5A(2) | P2EC5A(3) |
| Compressive Strength (MPA) | 79.57 | 50.08 | 59.91 | 69.81 |
| (Std Deviation) | 2.19 | 4.21 | 3.91 | 3.75 |
| Barco) Hardness | 10.00 | 44.00 | 42.00 | 44.00 |
| (Std Deviation) | 1.10 | 1.80 | 1.40 | 2.30 |
| Post Cured @ 73 deg for 90 minutes | yes | | | yes |
| Strength increase after heat treatment | | | | 40% |
| QUARTZ Predominately Silica (SiO2) | | | | |
| YB1 (1-.25 mm) | | | | |
| YB2 (4.5-1 mm) | | | | |
| RIS1 (.30-.15 mm) | 25.217% | 61.646% | 61.720% | 61.646% |
| EC (1-.25 mm) | 25.217% | | | |
| EC (.85-1.2 mm) | 7.860% | 11.416% | 11.430% | 11.416% |
| EC (1.8-2.2 mm) | 7.860% | 11.416% | 11.430% | 11.416% |
| EC (2.8-3.2 mm) | 11.790% | | | |
| EC O/S (1-5 mm) | | | | 3.930% |
| FILLERS | | | | |
| A1203 B153 (10 um) | | | | |
| RESINS | | | | |
| Isopthalic NPG polyester resin (POLYPLEX SS15) | | 15.031% | 15.049% | 15.031% |
| GY 191 CI (62.5%) Aradur 2961 LC 2000 (37.5%) | | | | |
| Entropy Epoxy Resin (70%) | 12.607% | | | |
| Entropy Epoxy Hardener (30%) | 5.404% | | | |
| INITIATOR | | | | |
| MEKP NR 20 | | 0.161% | 0.161% | 0.161% |
| PERFORMANCE ADDITIVE | | | | |
| BYK C8000 Polymeric coupling agent | | 0.120% | | 0.120% |
| DECORATIVE ADDITIVES | | | | |
| Liquid Colours .6-1 mm Garnet | 0.115% | 0.210% | 0.210% | 0.210% |
| SAMPLE NO | P2EC5A(4) | P2EC5A(7) | P2ECLARGE(1) | P2ECLARGE(2) |
| Compressive Strength (MPA) | 75.34 | 73.17 | 78.03 | 72.37 |
| (Std Deviation) | 9.67 | 2.63 | 1.72 | 7.71 |
| Barcol Hardness | 41.00 | 10.00 | 46.00 | 39.00 |
| (Std Deviation) | 1.00 | 1.20 | 2.70 | 2.50 |
| Post Cured @ 73 deg for 90 minutes | yes | | yes | yes |

TABLE 2-continued

| | | | | |
|---|---|---|---|---|
| Strength Increase after heat treatment | 26% | | | |
| QUARTZ Predominately Silica (SiO2) | | | | |
| YB1 (1-.25 mm) | | | | |
| YB2 (4.5-1 mm) | | | | 8.316% |
| RIS1 (.30-.15 mm) | 61.785% | 59.350% | 16.667% | 16.632% |
| EC (1-.25 mm) | | | 16.667% | 16.632% |
| EC (.85-1.2 mm) | 11.442 | 10.991% | 16.667% | 16.632% |
| EC (1.8-2.2 mm) | 11.442 | 10.991% | 12.500% | 12.474% |
| EC (2.8- 3.2 mm) | | | 12.500% | 12.474% |
| EC O/S (1-5 mm) | 8.333% | | | |
| FILLERS | | | | |
| A1203 B153 (10 um) | | | | |
| RESINS | | | | |
| Isopthalic NPG polyester resin (POLYPLEX SS15) | 15.065% | | 16.413% | 16.379% |
| GY 191 CI (62.5%) Aradur 2961 LC 2000 (37.5%) | | | | |
| Entropy Epoxy Resin (70%) | | 12.823% | | |
| Entropy Epoxy Hardener (30%) | | 5.495% | | |
| INITIATOR | | | | |
| MEKP NR 20 | 0.161% | | 0.131% | 0.131% |
| PERFORMANCE ADDITIVE | | | | |
| BYK C8000 Polymeric coupling agent | | | 0.017% | 0.017% |
| DECORATIVE ADDITIVES | | | | |
| Liquid Colours .6-1 mm Garnet | 0.105% | 0.350% | 0.105% | 0.313% |

The composition is applied to a surface Formwork can be used to contain the composition until it is cured.

The composite material is allowed to harden at room temperature—which will occur between 1 and 3 hours.

The formwork is then removed leaving the cast material adhering to the substrate.

When the product has hardened it is post cured by being heated to 80° C. for a period of at least 2 hours to completely harden and chemically stabilise the composite materials.

The cured surface can be polished if desired as follows:

After the composite material has been cast and cured, the surface is polished flat with a course disc on mobile concrete polishing equipment, to ensure the floor is flat and any undulations or variability in the cast sections are removed.

The floor is then continuously polished with increasingly finer grades' of polishing discs until the desired level of gloss and slip resistance is achieved.

With preferred embodiments of the present invention, surface performance is superior to most other flooring surfaces, less maintenance is required, and no sealing is needed due to the non-porous nature of the composite material. Standard segmented flooring products such as ceramic tile and natural stone require specialised bonding adhesive and grouts to fill necessary gaps between segments after installation. The material of the present invention is cast in-situ and has inherent bonding capability therefore removing the necessity to use a bonding adhesive during application.

The finished product performance of the composition of preferred embodiments of the present invention confers the following benefits:
porosity/stain resistance
hardness/scratch resistance
seamless application
aesthetic appeal/design diversity
slip resistance/level of polish
customisability/individual application
mechanical/flexural qualities
Lack of maintenance, With preferred embodiments of the present invention it is possible to:
cast in-situ into existing buildings over existing substrate
surface areas seamlessly over different levels and over concrete joints
cast large areas without batch variations inherent in many manufactured flooring products.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown for described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

The invention claimed is:

1. A flooring composition comprising:
5%-20% of a curable polyester or epoxy resin based on the total amount of the flooring composition; and
a plurality of silicas comprising:
(a) 10%-30% based on the total amount of the flooring composition of a silica having a particle range between 0.05-0.2 mm;
(b) 10%-30% based on the total amount of the flooring composition of a silica having a particle range between 0.1-2.0 mm;
(c) 5%-25% based on the total amount of the flooring composition of a silica having a particle range between 0.6-2.0 mm;
(d) 5%-25% based on the total amount of the flooring composition of a silica having a particle range between 2.0-3.0 mm;
(e) 5%-20% based on the total amount of the flooring composition of a silica having a particle range between 3.0-4.0 mm; and
(f) 2%-15% based on the total amount of the flooring composition of a silica having a particle range between 1.0-5.0 mm.

2. The composition of claim 1 wherein,
silica (a) is 16%-27% based on the total amount of the flooring composition;
silica (b) is 16%-27% based on the total amount of the flooring composition;
silica (c) is 8%-17% based on the total amount of the flooring composition;
silica (d) is 8%-13% based on the total amount of the flooring composition;
silica (e) is 11%-13% based on the total amount of the flooring composition; and
silica (f) is 4%-9% based on the total amount of the flooring composition.

3. The flooring composition of claim 1, wherein the curable polyester or epoxy resin is between 12%-17% based on the total amount of the flooring composition of.

4. The flooring composition of claim 1 further comprising a mineral filler.

5. The flooring composition of claim 4, wherein the mineral filler comprises between 0.5%-5% alumina hydrate.

6. The flooring composition of claim 1 further comprising decorative additives.

7. The flooring composition of claim 1 having a compressive strength of between 50 MPA-100 MPA.

8. The flooring composition of claim 1 having a Barcol Hardness of between 30-60.

9. The flooring composition of claim 1, wherein between 50-70% of the silicas have a particle range of between 50 μm-1 mm, and between 30-50% of the silicas have a particle range of between 1-5 mm.

10. The flooring composition of claim 1 having a Barcol Hardness of between 39-46.

11. The flooring composition of claim 1 further comprising a curing agent or an initiator agent.

12. The flooring composition of claim 11, wherein the curing agent or the initiator agent comprises between 0.13%-0.23% methyl ethyl ketone peroxide.

13. A cured composition comprising: subjecting the flooring composition of claim 1 to a temperature of between 50-90° C. for between 30 minutes to 3 hours.

14. A method for applying the flooring composition of claim 1 to a surface, the method comprising:
providing formwork on the surface;
applying the flooring composition in the formwork without trapping air in the flooring composition;
levelling the surface of the applied flooring composition;
hardening the flooring composition in the formwork; and
post curing the flooring composition.

15. A flooring composition comprising:
5%-20% of a curable polyester or epoxy resin based on the total amount of the flooring composition; and
a plurality of silicas comprising:
(a) 10%-30% based on the total amount of the flooring composition of a silica having a particle range between 0.15-0.3 mm;
(b) 10%-30% based on the total amount of the flooring composition of a silica having a particle range between 0.25-1.0 mm;
(c) 5%-25% based on the total amount of the flooring composition of a silica having a particle range between 0.85-1.2 mm;
(d) 5%-25% based on the total amount of the flooring composition of a silica having a particle range between 1.8-2.2 mm;
(e) 5%-20% based on the total amount of the flooring composition of a silica having a particle range between 2.8-3.2 mm; and
(f) 2%-15% of a silica having a particle range between 1.0-5.0 mm.

16. A method of forming a flooring composition comprising:
(i) mixing a plurality of silicas with alumina hydrate in a first container to obtain a first mixture, wherein the plurality of silicas comprise:
(a) 10%-30% based on the total amount of the flooring composition of a silica having a particle range between 0.05-0.2 mm;
(b) 10%-30% based on the total amount of the flooring composition of a silica having a particle range between 0.1-2.0 mm;
(c) 5%-25% based on the total amount of the flooring composition of a silica having a particle range between 0.6-2.0 mm;
(d) 5%-25% based on the total amount of the flooring composition of a silica having a particle range between 2.0-3.0 mm;
(e) 5%-20% based on the total amount of the flooring composition of a silica having a particle range between 3.0-4.0 mm; and
(f) 2%-15% based on the total amount of the flooring composition of a silica having a particle range between 1.0-5.0 mm
(ii) mixing the curable polyester or the epoxy resin with a coupling agent and an initiator in a second container to obtain a second mixture;
(iii) combining and mixing the first mixture and second mixture in a container to obtain a mixture; and
(iv) applying reduced pressure to the container to remove air from the mixture.

* * * * *